(12) United States Patent
Kim

(10) Patent No.: US 10,696,011 B2
(45) Date of Patent: Jun. 30, 2020

(54) DISPLAY DEVICE INCLUDING FINE BUMP FOR ADJUSTING ATTACHMENT AND DETACHMENT AND MANUFACTURING METHOD THEREFOR

(71) Applicant: MAXGEN TECHNOLOGY CO., LTD., Gyeonggi-do (KR)

(72) Inventor: Young Su Kim, Suwon-si (KR)

(73) Assignee: MAXGEN TECHNOLOGY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/336,283

(22) PCT Filed: Sep. 23, 2017

(86) PCT No.: PCT/KR2017/010514
§ 371 (c)(1),
(2) Date: Mar. 25, 2019

(87) PCT Pub. No.: WO2018/066853
PCT Pub. Date: Apr. 12, 2018

(65) Prior Publication Data
US 2020/0023607 A1    Jan. 23, 2020

(30) Foreign Application Priority Data

Oct. 3, 2016 (KR) .......... 10-2016-0127308
Sep. 20, 2017 (KR) .......... 10-2017-0120935

(51) Int. Cl.
*B32B 3/30* (2006.01)
*G06F 3/041* (2006.01)
*B32B 7/06* (2019.01)

(52) U.S. Cl.
CPC .......... *B32B 3/30* (2013.01); *B32B 7/06* (2013.01); *G06F 3/041* (2013.01); *B32B 2457/20* (2013.01); *G06F 2203/04103* (2013.01)

(58) Field of Classification Search
CPC ......... B32B 3/30; B32B 7/06; B32B 2457/20; G06F 3/041; G06F 2203/04103
See application file for complete search history.

(56) References Cited

U.S. PATENT DOCUMENTS 7,589,798 B2 * 9/2009 Takahata ............. G02F 1/13338
345/173
2009/0261720 A1 * 10/2009 Shinto ................. H01L 27/3276
313/504

(Continued)

FOREIGN PATENT DOCUMENTS

KR    20120003322    1/2012
KR    20140124578    10/2014

(Continued)

OTHER PUBLICATIONS

International Search Report—PCT/KR2017/010514 dated Dec. 26, 2017.

*Primary Examiner* — Sejoon Ahn
(74) *Attorney, Agent, or Firm* — Cantor Colburn LLP

(57) ABSTRACT

Provided are a display device including micro protrusions for attachment and detachment control, having supplemented functions, such as control of adhesive strength for attachment and detachment, the prevention of attachment of an alien substance, fingerprint prevention, the easy removal of bubbles, and a smooth application to a curved display when a window or touch screen is attached or detached, and a method of manufacturing the same. In the device and method, the display device including a window and a display and selectively including a touch screen includes an attach- (Continued)

ment and detachment layer positioned in any one of the window, the touch screen, and the display and having adhesive strength of 0.1 gf/25 mm to 500 gf/25 mm, and an attachment and detachment control layer positioned to face the attachment and detachment layer in any one of the window, the touch screen, and the display and having micro protrusions formed therein.

13 Claims, 6 Drawing Sheets

(56) References Cited

U.S. PATENT DOCUMENTS

| 2010/0225605 | A1* | 9/2010 | Wang | G06F 3/045 |
| | | | | 345/173 |
| 2016/0216804 | A1* | 7/2016 | Kobayashi | B32B 27/36 |

FOREIGN PATENT DOCUMENTS

| KR | 20150034829 | 4/2015 |
| KR | 101574923 | 12/2015 |
| KR | 20150142214 | 12/2015 |

* cited by examiner (a)

(b)

(c)

DISPLAY DEVICE INCLUDING FINE BUMP FOR ADJUSTING ATTACHMENT AND DETACHMENT AND MANUFACTURING METHOD THEREFOR

TECHNICAL FIELD

The present invention relates to a display device and a method of manufacturing the same and, more particularly, to a display device applied to a detachable window or touch screen using an attachment and detachment control layer having micro protrusions and a method of manufacturing the same.

BACKGROUND ART

In a display device, a display, such as a liquid crystal display (LCD), an organic light-emitting diode (OLED) or an electrophoresis display (EPD), forms a screen. The display device is applied to a variety of types of image screen devices. Meanwhile, the device adopts a touch screen in order to provide convenience of a manipulation. A window formed of tempered glass or transparent polymer resin is positioned on the front of the touch screen. The window is divided into a screen part and a bezel part, that is, an edge, at its central part, and protects the display device against an external impact or damage attributable to a contact. The window is attached and fixed to the touch screen by a transparent adhesive (OCA) or an ultraviolet rays-curing adhesive. With the recent emergence of a flexible and bent display, a corresponding window also emerges.

Meanwhile, Korean Patent No. 10-1574923 suggests a display device having a detachable window and a method of attaching or detaching the window. Specifically, the patent can easily replace a damaged window because the damaged window can be easily separated, has a simple process of fabricating a display device, has a low production cost, and can be designed in various ways. Likewise, the patent enables a display device capable of attaching or detaching a touch screen. However, in addition to the characteristics suggested in the patent, functions, such as control of adhesive strength for attachment and detachment, the prevention of attachment of an alien substance, fingerprint prevention, the easy removal of bubbles, and a smooth application to a curved display, need to be supplemented. That is, this is for matching a detachable window or touch screen with various usages and environments.

DISCLOSURE

Technical Problem

An object of the present invention is to provide a display device including micro protrusions for attachment and detachment control, having supplemented functions, such as control of adhesive strength for attachment and detachment, the prevention of attachment of an alien substance, fingerprint prevention, the easy removal of bubbles, and a smooth application to a curved display when a window or touch screen is attached or detached, and a method of manufacturing the same.

Technical Solution

A display device including micro protrusions for attachment and detachment control for achieving an object of the present invention is a display device including a window and a display and selectively including a touch screen, including an attachment and detachment layer positioned in any one of the window, the touch screen, and the display and having adhesive strength of 0.1 gf/25 mm to 500 gf/25 mm and an attachment and detachment control layer positioned to face the attachment and detachment layer in any one of the window, the touch screen, and the display and having micro protrusions formed therein.

In the device of the present invention, at least one of different attachment and detachment layers having the same material as an adhesive layer or the attachment and detachment layer may be present between the window, the touch screen, and the display. The attachment and detachment layer may be any one selected from an adhesive in which a cross linker is mixed with a thermosetting resin or ultraviolet curing resin of an acrylic polymer, a silicon-based polymer or an urethane-based polymer, or a mixture thereof, or a copolymer thereof. The attachment and detachment layer may be configured with pockets filled with a liquid fluid or may have a pattern cured by heat or ultraviolet rays. The attachment and detachment layer is burrowed into the micro protrusions of the attachment and detachment control layer, thereby making transparent the attachment and detachment control layer.

In the device of the present invention, the attachment and detachment control layer may include a fluoro-based resin or a silicon-based resin. A deposition layer made of titania ($TiO_2$) or silica ($SiO_2$) and a layer including a fluoro-based resin or silicon-based resin on the deposition layer may be stacked on the attachment and detachment control layer. The attachment and detachment layer may have adhesive strength of 0.5 gf/25 mm to 500 gf/25 mm by the attachment and detachment control layer.

In the device of the present invention, a cross section of the micro protrusion may have an angle, forms curvature or has a combination of the angle and the curvature. The micro protrusions may be arranged in a line form, lattice form, island form or combined form of the line, lattice and island. The attachment and detachment control layer may be an attachment and detachment control pattern divided into a flat part not having the micro protrusions and an uneven part having the micro protrusions. The attachment and detachment control pattern may be configured in a stripe form, lattice form, fence form or combined form of the stripe, lattice and fence. In the attachment and detachment control pattern, the uneven part may correspond to a curved edge or a bent part.

In the device of the present invention, any one of the attachment and detachment layer or the attachment and detachment control layer may be present on a touch screen cover layer positioned on the touch screen.

A method of manufacturing a display device including micro protrusions for attachment and detachment control for achieving another object of the present invention is a method of manufacturing a display device including a window and a display and selectively including a touch screen. First, an attachment and detachment control layer in which micro protrusions have been formed is formed in any one of the window, the touch screen, and the display. Thereafter, an attachment and detachment layer, positioned in any one of the window, the touch screen, and the display and having adhesive strength of 0.1 gf/25 mm to 500 gf/25 mm, is attached to the attachment and detachment control layer.

In the method of the present invention, the attachment and detachment layer is burrowed into the micro protrusions of the attachment and detachment control layer, thereby making transparent the attachment and detachment control layer.

A cross section of the micro protrusion may have an angle, forms curvature or has a combination of the angle and the curvature. The micro protrusions may be arranged in a line form, lattice form, island form or combined form of the line, lattice and island. The attachment and detachment control layer may be an attachment and detachment control pattern divided into a flat part not having the micro protrusions and an uneven part having the micro protrusions. The attachment and detachment control pattern may be configured in a stripe form, lattice form, fence form or combined form of the stripe, lattice and fence.

In the method of the present invention, the micro protrusions may be formed by any one of methods of mixing an ultraviolet rays-curing or thermosetting resin with semitransparent beads, such as silica, coating the mixture on the attachment and detachment control layer, and curing the coating, or compressing the attachment and detachment control layer on which the ultraviolet rays-curing or thermosetting resin has been coated by a sheet or roll mold on which shapes of the micro protrusions have been engraved and curing the compressed attachment and detachment control layer, or transferring a film or sheet on which the ultraviolet rays-curing or thermosetting resin has been coated or forming the micro protrusions in a mold having a shape matched with the micro protrusions, or radiating a laser beam to a surface of the attachment and detachment control layer, or printing ultraviolet rays-curing or thermosetting ink on a surface of the attachment and detachment control layer or applying a physical impact on a surface of the attachment and detachment control layer, or performing coating after masking or performing exposure or etching.

Advantageous Effects

In accordance with the display device including micro protrusions for attachment and detachment control and method of manufacturing the same according to the present invention, functions, such as control of adhesive strength for attachment and detachment, the prevention of attachment of an alien substance, fingerprint prevention, the easy removal of bubbles, and a smooth application to a curved display when a window structure or a touch screen structure is attached or detached, can be supplemented because the attachment and detachment control layer is equipped with the micro protrusions.

MODE FOR INVENTION

Figure 1:
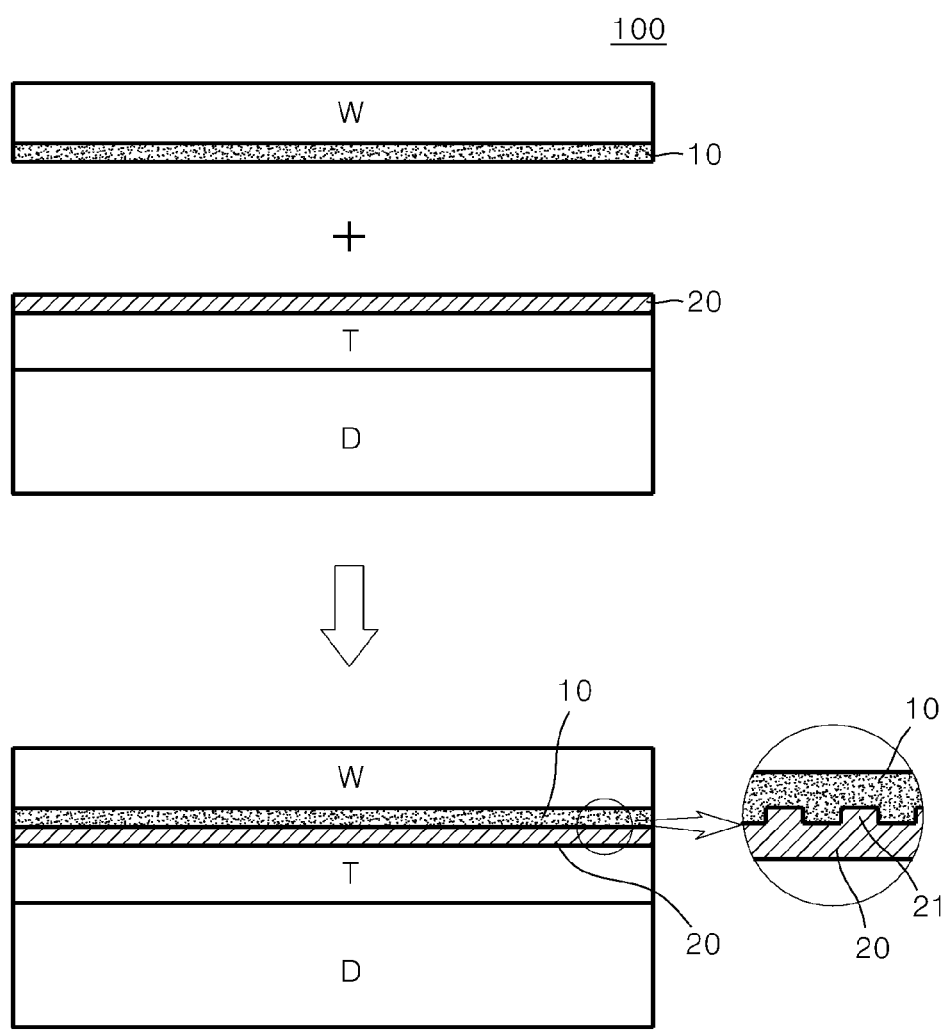
FIG. 1 is an exploded sectional view showing a first display device according to the present invention.

Hereinafter, preferred embodiments of the present invention are described in detail with reference to the accompanying drawings. The following embodiments may be modified in various other forms and the scope of the present invention is not limited to the following embodiments. The embodiments of the present invention are provided to a person having ordinary skill in the art in order to describe the present invention more fully. Furthermore, in the drawings, the thickness of films (layers, patterns) and regions may be exaggerated for clarity. Furthermore, when it is described that one film (layer, pattern) is present "on", "over", "below (or under)", "on one surface" of the other film (layer, pattern), it may be directly formed on the other film (layer, pattern) or a different film (layer, pattern) may be interposed therebetween.

An embodiment of the present invention proposes a display device for attachment and detachment control, having supplemented functions, such as control of adhesive strength for attachment and detachment, the prevention of attachment of an alien substance, fingerprint prevention, the easy removal of bubbles, and a smooth application to a curved display, when a window structure or a touch screen structure is attached or detached because an attachment and detachment control layer is equipped with micro protrusions, and a method of manufacturing the same. In this case, the window structure (hereinafter referred to as a "window") is an element of a display device including a transparent sheet. The touch screen structure (hereinafter referred to as a "touch screen") is another element of a display device including a touch screen.

The window or touch screen of a display device according to an embodiment of the present invention has an attachment and detachment layer, attached to or detached from a touch screen or display structure, respectively, formed therein. In this case, the display structure is another element of the display device including a display, such as a liquid crystal display (LCD), an organic light-emitting diode (OLED) or an electrophoresis display (EPD), and is hereinafter referred to as a "display." It may be said that a device on which attachment or detachment is performed is associated with the touch screen or the display. In this case, the attachment and detachment mean that the attachment and detachment layer is freely attached to or detached from the device on which attachment or detachment is performed. The attachment and detachment layer according to an embodiment of the present invention has adhesive strength of 0.1 gf/25 mm to 500 gf/25 mm.

The attachment and detachment layer of the present invention is limited to attachment to or detachment from the touch screen and the display, and is overtly different from a conventional window protection film attached to or detached from a window. Meanwhile, a device configured with a display without a window or touch screen is not a display device of a complete form. A display device is completed only when the window or touch screen of the present invention is attached. However, the window protection film is attached on the window. The window protection film is attached to an already completed display device. Accordingly, the window or touch screen of the present invention is an essential element forming a display device, but the conventional window protection film corresponds to an assistant element which may be selectively applied to a display device. Accordingly, the window protection film is excluded from the category of the present invention.

A display device applied to an embodiment of the present invention refers to all image processing devices, such as a mobile device, an information processing terminal, and television. The mobile device includes a handheld phone, a smartphone, and a tablet. The information processing terminal includes ATM and Kiosk. The display of the display device also includes a flat or bent type and is also flexible. The image processing device includes a window, a touch screen, and a display. Accordingly, the window generally refers to the windows of all image processing devices, such as the window of a mobile device, the window of an information processing terminal, and television. Likewise, the touch screen and the display also refer to a touch screen and a display applied to all image processing devices.

Meanwhile, a display device applied to an embodiment of the present invention does not include a touch screen, and may be configured with a window and a display. In other words, the display device of the present invention may be configured with a window, a touch screen, and a display or may be configured with a window and a display. Hereinafter, a display device including a touch screen is taken as an example. Furthermore, a display device to be described later will be described as having an attachment and detachment layer formed in a window or touch screen and having an attachment and detachment control layer formed in a corresponding touch screen or the display. In some cases, however, an attachment and detachment control layer may be present in a window or touch screen, and an attachment and detachment layer may be present in a corresponding touch screen or display. In this case, the former case has been taken as an example.

Figure 2:
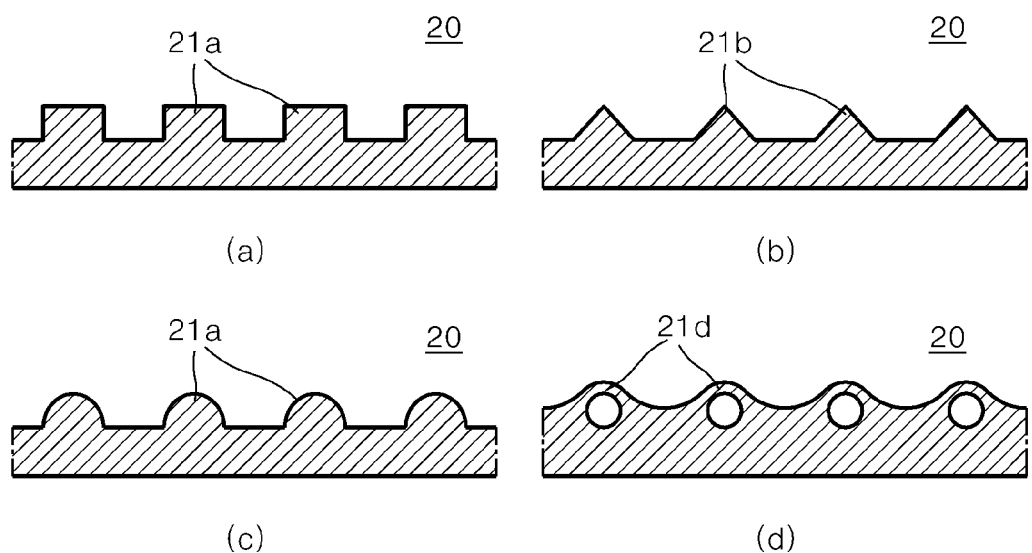
FIG. 2 shows cross-sectional views proposing cases of micro protrusions present in an attachment and detachment control layer of FIG. 1.

FIG. 1 is an exploded sectional view showing a first display device 100 according to an embodiment of the present invention. FIG. 2 shows cross-sectional views proposing cases of micro protrusions present in an attachment and detachment control layer 20 of FIG. 1. In this case, the sectional view has not been represented in a strict sense, and an element not shown in the sectional view for convenience of description may be present.

Referring to FIG. 1, the first display device 100 is configured by sequentially stacking a display D, a touch screen T, an attachment and detachment control layer 20, an attachment and detachment layer 10, and a window W. The display D is a structure including a liquid crystal display (LCD), an organic light-emitting diode (OLED), an electrophoresis display (EPD), etc., and uses quantum dots. As described above, the display D may include a part and function for configuring a screen on which information is displayed. The display D according to an embodiment of the present invention includes all things configuring a screen on which information is displayed.

The touch screen T has a conductive pattern formed on one or both sides of an insulating layer made of metal oxide or plastic. Metal oxide is chiefly applied to the conductive pattern. The metal oxide includes ITO, ATO, ZnO, Cu, a conductive polymer or a silver nano wire. The touch screen T is an input device for receiving a corresponding location when the input device is touched by a finger, and includes all methods of receiving a corresponding location although an input device is not touched by a finger. Accordingly, the touch screen T includes all functions for identifying locations.

The window W includes a transparent sheet, and may have a print layer for expressing a variety of types of functions and a function layer, such as a shatter-resistant film. Any transparent material may be used as the transparent sheet without any limitation. For example, transparent sheet may include a glass substrate or a plastic substrate. Specifically, the glass substrate may be tempered glass. The plastic substrate may include any one or any one or more of polyethylene terephthalate (PET), polyethylene naphthalate (PEN), polyether sulfone (PES), polyimide (PI), polyarylate (PAR), polycarbonate (PC), polymethyl methacrylate (PMMA) or cycloolefin copolymer (COC). The window W may be a stack structure in which tempered glass and a plastic substrate have been formed in multiple layers.

If the transparent sheet forming the window W is a glass substrate, the glass substrates may be stacked and used. For example, the transparent sheet may have a structure, such as a glass substrate/adhesive layer/glass substrate/adhesive layer . . . /shatter-resistant film. If the glass substrate, particularly, tempered glass is stacked, the tempered glass is rarely damaged because the ability to absorb an external impact is increased.

Any one or any one or more of transparent, semi-transparent or color coatings may be applied to the print layer. The print layer may be formed using silk printing, or inkjet printing using UV, or inkjet printing using thermosetting, or transfer. A functional coating layer, such as a fingerprint-resistant coating, an antibiotic coating or an anti-scratch coating, may be formed on the transparent sheet. The functional coating layer may be formed by wet coating that applies a coating agent and dry coating, such as deposition. Furthermore, characteristics, such as shielding, reflection prevention, blue light shielding, electromagnetic wave shielding or privacy, may be assigned to the bottom of the glass substrate or plastic substrate of the window W. Furthermore, an opening for exposing a button, a camera, a speaker, etc. may have been formed in the window W.

If the glass substrate or plastic substrate, that is, the transparent sheet stacked on the window W or a combination of them is used, a print layer may be included in each layer. In the combination, for example, a glass substrate/adhesive layer may be repeated, a plastic substrate/adhesive layer may be repeated or a glass substrate/adhesive layer/plastic substrate/adhesive layer may be repeated. If the print layer is present in each layer, a pattern represented by the print layer has a stereoscopic effect. That is, the printed pattern represented in each layer appears as a three-dimensional stereoscopic pattern by the reflection of light and interference.

Although not shown, the first display device 100 of the present invention may include an adhesive layer. The adhesive layer may be positioned between the display D and the touch screen T, the transparent sheet and the shatter-resistant film, a multi-layer transparent sheet, etc. The display D and the touch screen T are not bonded by an adhesive layer and may be compressed without an adhesive layer. A thermosetting adhesive or ultraviolet-curing adhesive may be used as the adhesive layer, but is not limited thereto and an OCA tape may be used as the adhesive layer. Such use of the adhesive layer is known and a detailed description thereof is omitted.

The attachment and detachment layer 10 has adhesive strength of 0.1 gf/25 mm to 500 gf/25 mm. The attachment and detachment layer 10 may be made of various materials within the category of the present invention. For example, the attachment and detachment layer may be any one selected from an adhesive in which a cross linker is mixed with a thermosetting resin or ultraviolet curing resin, that is, an acrylic polymer, a silicon-based polymer or an urethane-based polymer, or a mixture thereof, or a copolymer thereof. The attachment and detachment layer 10 may be an attachment and detachment fluid layer, that is, a pocket form including a fluid or may be an attachment and detachment pattern that is partially cured to form a pattern. The attachment and detachment fluid layer includes an adhesive surface adhered to a transparent sheet in a pocket form, a gluing surface attached to a display part, and a side positioned between the adhesive surface and the gluing surface to form a sidewall. The pocket provides the space where a liquid fluid is filled. In the attachment and detachment pattern, a glue layer having adhesive strength of about 0.1 gf/25 mm to 500 gf/25 mm, and a curing layer formed by curing the glue layer form the pattern.

Meanwhile, the attachment and detachment control layer 20 according to an embodiment of the present invention is positioned on the touch screen T. The attachment and detachment control layer 20 increases a slip property by reducing a frictional force. The attachment and detachment control layer 20 enables the window W to be easily attached to or detached from the touch screen T. A coating agent including a fluoro-based resin or silicon-based resin may be used as the attachment and detachment control layer 20. The attachment and detachment control layer 20 may be formed by depositing titania (TiO$_2$) or silica (SiO$_2$) on the touch screen T and then coating a fluoro-based resin or silicon-based resin on the deposited touch screen T. In this case, the fluoro-based resin or silicon-based resin may be formed by easy cleaning coating (ECC) methods. If the attachment and detachment control layer 20 is applied, the occurrence of bubbles can be suppressed more effectively when the window W is attached. Furthermore, the attachment and detachment control layer 20 enables a consumer to easily attach or detach the window W without a separate tool.

The attachment and detachment layer 10 has a self-adhesive strength. The self-adhesive strength is the property that the attachment and detachment layer 10 autonomously adheres to the touch screen T without bubbles if the attachment and detachment layer 10 has only to be placed on the touch screen T. Meanwhile, if the attachment and detachment control layer 20 is applied to the touch screen T, a further improved self-adhesive strength is obtained compared to a case where the attachment and detachment control layer 20 is not present. Adhesive strength according to an embodiment of the present invention may be different depending on the presence of the attachment and detachment control layer 20. Adhesive strength when the attachment and detachment control layer 20 is present is 0.5 gf/25 mm to 500 gf/25 mm, but adhesive strength when the attachment and detachment control layer 20 is not present is 0.1 gf/25 mm to 200 gf/25 mm. If the attachment and detachment layers 10 having the same material and thickness are present, when the attachment and detachment control layer 20 is present, it is easier to attach the window W without bubbles. Furthermore, the separation of the window W occurs relatively easily due to the influence of the attachment and detachment control layer 20.

Referring to FIG. 2, micro protrusions 21 of various forms are formed in the attachment and detachment control layer 20. In this case, some cases are proposed. In this case, an example in which the micro protrusion 21 has a cross section formed in any one shape selected from a quadrangle 21a, a triangle 21b, and a circle 21c or formed by a bead or a bead and binder 21d has been taken. That is, the cross section of the micro protrusion 21 may have an angle or form curvature or may have a combination of them. If the micro protrusions 21 are formed in the attachment and detachment control layer 20, transmittance of light is lowered because the attachment and detachment control layer 20 is semi-transparent. The attachment and detachment control layer 20 including the micro protrusions 21 having low transmittance has low transmittance, and is distinguished from a transparent attachment and detachment control layer 20 not including a micro protrusion 21 with the naked eye.

The micro protrusion 21 generates various effects, such as fingerprint prevention, contamination prevention, and reflection prevention. If the micro protrusions 21 are present, the forming of a fingerprint and the attachment of a contamination material are present because a portion with which a fingerprint or contamination material is stained becomes discontinuous. Specifically, a protruded portion of the micro protrusion 21 may be stained with a fingerprint or contamination material, but a fingerprint or contamination material is not attached to a concave portion of the micro protrusion 21. Accordingly, the micro protrusion 21 has fingerprint prevention, contamination prevention effects. Furthermore, the micro protrusions 21 induce diffused reflection. The diffused reflection blocks external light so that is not reflected by the screen part of the first display device 100. Moreover, bubbles can be easily discharged because the micro protrusion 21 has a concave portion. That is, the micro protrusions 21 enable the attachment and detachment layer 10 to be stably attached to or detached from the attachment and detachment control layer 20.

When the attachment and detachment layer 10 is attached to the attachment and detachment control layer 20 in which the micro protrusions 21 have been formed according to an embodiment of the present invention, a semi-transparent screen is changed transparently because the glue agent of the attachment and detachment layer 10 is burrowed into the space between the micro protrusions 21. Accordingly, although the attachment and detachment control layer 20 is used in which the micro protrusions 21 have been formed, screen clearness in the transparent state can continue to be maintained. In the drawing, the glue agent of the attachment and detachment layer has been illustrated as being burrowed into the space between the micro protrusions 21.

Figure 3:
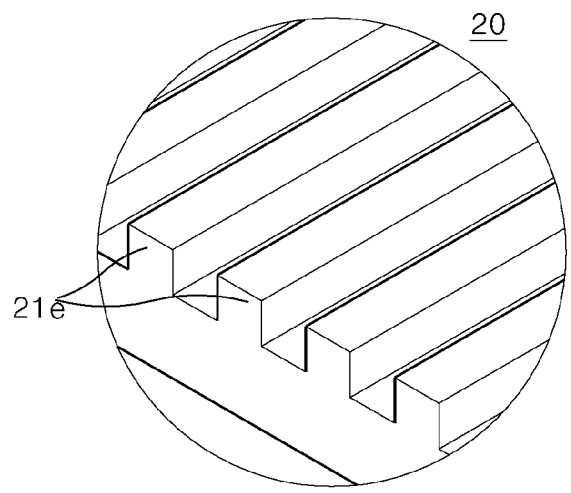
FIG. 3 shows partial perspective views proposing cases of an array of micro protrusions present in the attachment and detachment control layer of FIG. 1.
Figure 3:
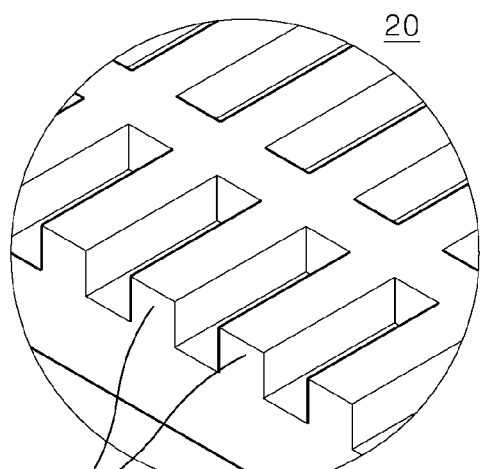
Figure 3:
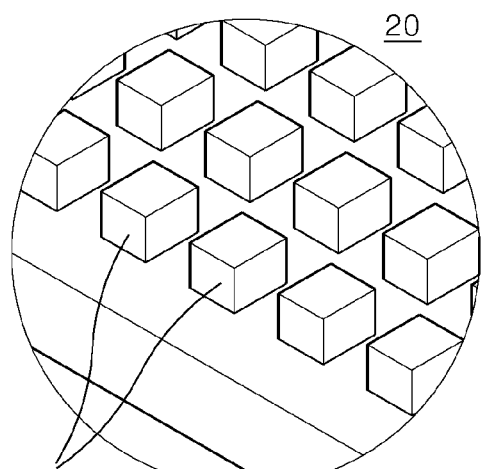

FIG. 3 shows partial perspective views proposing cases of an array of micro protrusions present in the attachment and detachment control layer 20 of FIG. 1. In this case, for the micro protrusions, reference is made to FIGS. 1 and 2.

Referring to FIG. 3, the micro protrusions 21 may have an array, such as a line form (a) 21e, a lattice form (b) 21f or an island form (c) 21g. In this case, in the array of the micro protrusions 21, the cross section of the micro protrusion has been illustrated as being the quadrangle 21a, but the micro protrusion may be formed in any one shape selected from the triangle 21b and the circle 21c or may be formed by the bead or bead and binder 21d. That is, the cross section of the micro protrusion 21 has an angle or forms curvature or has a combination of them. Furthermore, the micro protrusions 21 may be regularly arranged at regular intervals, but may be irregularly arranged without a regular interval.

Figure 4:
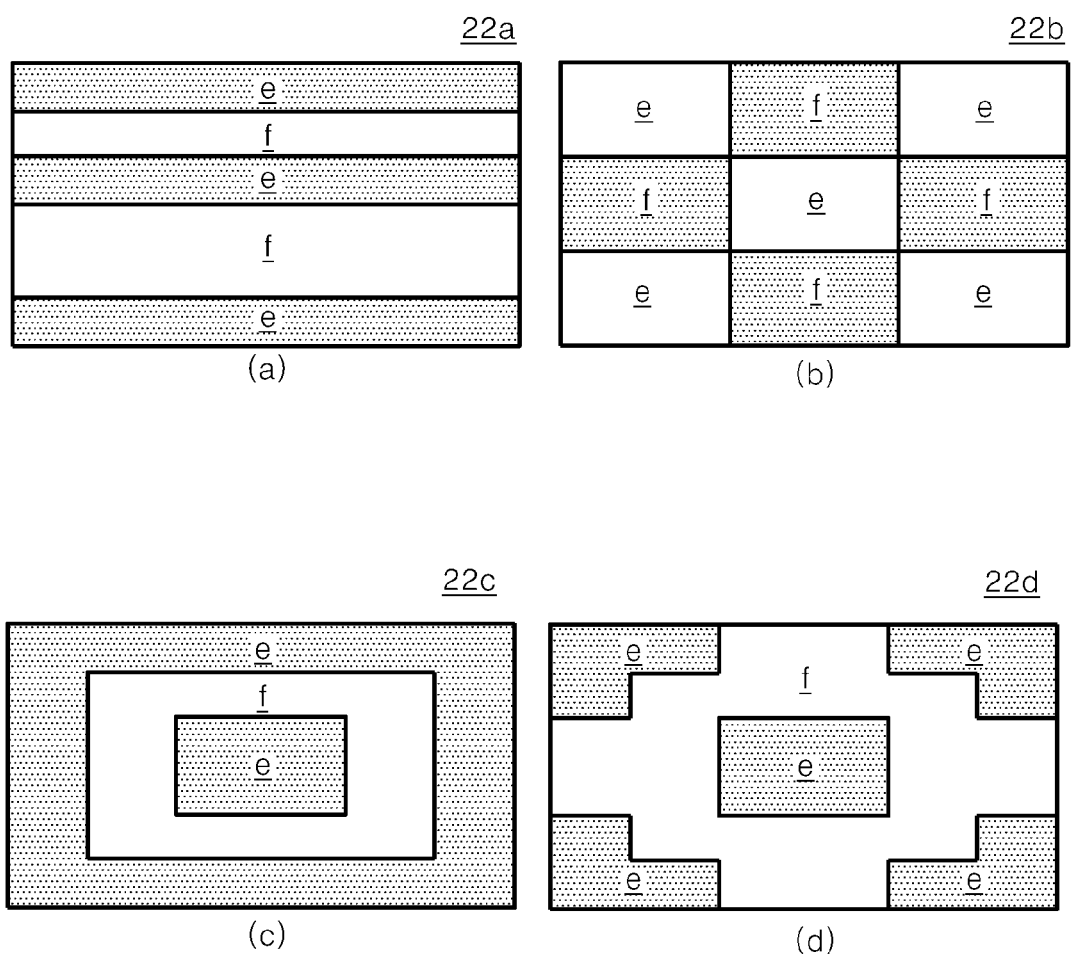
FIG. 4 shows plan views proposing cases of an attachment and detachment control pattern in which the attachment and detachment control layer applied to the first display device according to the present invention has been patternized.

FIG. 4 shows plan views proposing cases of an attachment and detachment control pattern 22 in which the attachment and detachment control layer 20 applied to the first display device 100 according to the present invention has been patternized. In this case, some pattern cases of the attachment and detachment control layer 20 have been illustrated, and thus the pattern of the attachment and detachment control layer 20 may be modified in various ways within the category of the present invention. In principle, the micro protrusions have been formed in the front surface of the attachment and detachment control layer 20, but the micro protrusions may be partially formed in a pattern form. In this case, "e" may be said to be a flat part not having a micro protrusion, and "f" may be said to be an uneven part having a micro protrusion. The uneven part "f" has a great binding power with the attachment and detachment layer 10 compared to the flat part "e" because the glue agent of the attachment and detachment layer 10 is burrowed into the space between the micro protrusions 21. That is, the uneven part "f" is accompanied by an anker effect in coupling with the attachment and detachment layer 10.

Referring to FIG. 4a, the flat part "e" and a curable uneven part "f" are disposed in the first attachment and detachment control pattern 22a in a stripe form. In this case, a fraction occupied by the flat parts "e" in all the flat parts "e" and the uneven parts "f" may be 5~95%. Order that the flat parts "e" and the uneven parts "f" are arranged may be different depending on a form of the window W to which a first attachment and detachment control pattern 22a of the present invention is applied. For example, when a bezel area is relatively wide, the uneven part "f" may be chiefly placed in the bezel area. As described above, the width of each of the flat part "e" and the uneven part "f" forming the first attachment and detachment control pattern 22a may be properly adjusted. In the drawing, the shape of the stripe is a quadrangle form having a regular thickness. In some cases, however, the shape of the stripe may be modified in a form, such as a wave shape.

Referring to FIG. 4b, in a second attachment and detachment control pattern 22b, the flat parts "e" and the uneven parts "f" are disposed within a lattice in a lattice form. Order that the flat parts "e" and the uneven parts "f" are arranged may be different depending on a form of the window W to which the second attachment and detachment control pattern 22b of the present invention is applied. For example, when a bezel area is great, the uneven parts "f" may be chiefly placed in the bezel area. As described above, the area of each of the flat part "e" and uneven part "f" forming the second attachment and detachment control pattern 22b may be properly adjusted. In the drawing, the shape of the lattice is a quadrangle form having a regular thickness. In some cases, however, the shape may include a shape, such as a circle or an ellipse.

Referring to FIG. 4c, in a third attachment and detachment control pattern 22c, the flat part "e" and the uneven part "f" closed in a fence form are disposed. Order that the flat part "e" and the uneven part "f" are arranged may be different depending on a form of the window W to which the third attachment and detachment control pattern 22c of the present invention is applied. For example, when a bezel area is great, the uneven parts "f" may be chiefly placed in the bezel area. As described above, the area of each of the flat part "e" and uneven part "f" forming the third attachment and detachment control pattern 22c may be properly adjusted. In the drawing, the shape of the fence is a quadrangle form having a regular thickness. In some cases, however, the shape may be modified like a wave shape.

Referring to FIG. 4d, in a fourth attachment and detachment control pattern 22, part of the closed fence of the third attachment and detachment control pattern 22c is penetrated by any one of the flat part "e" and the uneven part "f". Order that the flat part "e" and the uneven part "f" are arranged may be different depending on a form of the window W to which the fourth attachment and detachment control pattern 22d of the present invention is applied. For example, when a bezel area is great, the uneven parts "f" may be chiefly placed in the bezel area. As described above, the area of each of the flat part "e" and uneven part "f" forming the fourth attachment and detachment control pattern 22d may be properly adjusted. In the drawing, the shape of the fence is a quadrangle form having a regular thickness. In some cases, however, the shape may be modified like a wave shape.

The attachment and detachment control pattern 22 according to an embodiment of the present invention may be usefully applied to a curved display having an edge of a curved surface. If the area occupied by the uneven part "f" in the edge, that is, a curved surface, is increased, attachment in the edge, that is, a curved surface, becomes stronger because binding power between the attachment and detachment layer 10 and the uneven part "f" increases. Likewise, if the uneven part "f" is positioned in a bent part of the first display device 100, attachment to the touch screen T of the window W can be stabilized.

If the attachment and detachment layer 10 is attached to the attachment and detachment control pattern 22 (22a~22d) in which the micro protrusions 21 have been formed according to an embodiment of the present invention, a cloudy screen becomes transparent because the glue agent of the attachment and detachment layer 10 is burrowed into the space between the micro protrusions 21. Accordingly, although the attachment and detachment control pattern 22 is used in which the micro protrusions 21 have been formed, screen clearness in the transparent state can continue to be maintained. Adhesive strength that influences the attachment and detachment of the attachment and detachment layer 10 can be freely controlled by adjusting the fraction of the micro protrusions 21 of the attachment and detachment control pattern 22.

The micro protrusions 21 are formed using various methods. For example, the micro protrusions 21 may be formed by mixing semi-transparent beads, such as silica, with an ultraviolet rays-curing or thermosetting resin, coating the mixture on the attachment and detachment control layer 20, and then curing them. Furthermore, the micro protrusions 21 may be formed by compressing the attachment and detachment control layer 20, coated with an ultraviolet rays-curing or thermosetting resin, by a sheet or roll mold on which the shapes of the micro protrusions 21 have been engraved and then curing the attachment and detachment control layer 20. The attachment and detachment control layer 20 including the micro protrusions 21 may be fabricated by transferring a film or sheet coated with an ultraviolet rays-curing or thermosetting resin. The attachment and detachment control layer 20 may be formed by shaping it in the form of a mold having a shape matched with the micro protrusion 21.

Furthermore, the micro protrusions 21 may be formed by radiating a laser beam to a surface of the attachment and detachment control layer 20. The micro protrusions 21 may be formed by printing them on a surface of the attachment and detachment control layer 20 using ultraviolet rays-curing or thermosetting ink. The micro protrusions 21 may be formed on a surface of the attachment and detachment control layer 20 by applying a physical impact to the surface of the attachment and detachment control layer 20. The attachment and detachment control pattern 22 may be formed by coating resin after masking or forming the micro protrusions 21 through exposure or etching and removing the mask. In addition to the proposed methods, other methods may be applied as a method of forming the micro protrusions 21 within the category of the present invention.

The window W of the first display device 100 of the present invention is separately fabricated and protected by a heterogeneous film. The heterogeneous film is removed in order to attach the attachment and detachment layer 10 of the window W to the attachment and detachment control layer 20. When the heterogeneous film is removed, the attachment and detachment layer 10 is exposed. When the window structure W through which the attachment and detachment layer 10 has been exposed is attached to the attachment and detachment control layer 20 by a manual work, the first display 100 on which the window W has been mounted may be completed. Furthermore, if the window W has been damaged or is to be replaced, a new window W has only to be attached by separating the window W by a manual work. In this case, the attachment and detachment control layer 20 in which the micro protrusions 21 have been formed autonomously has effects, such as fingerprint prevention, contamination prevention and reflection prevention, and has an effect in that the attachment and detachment layer 10 is stably attached to or detached by the micro protrusions 21 without deteriorating screen clearness.

Figure 5:
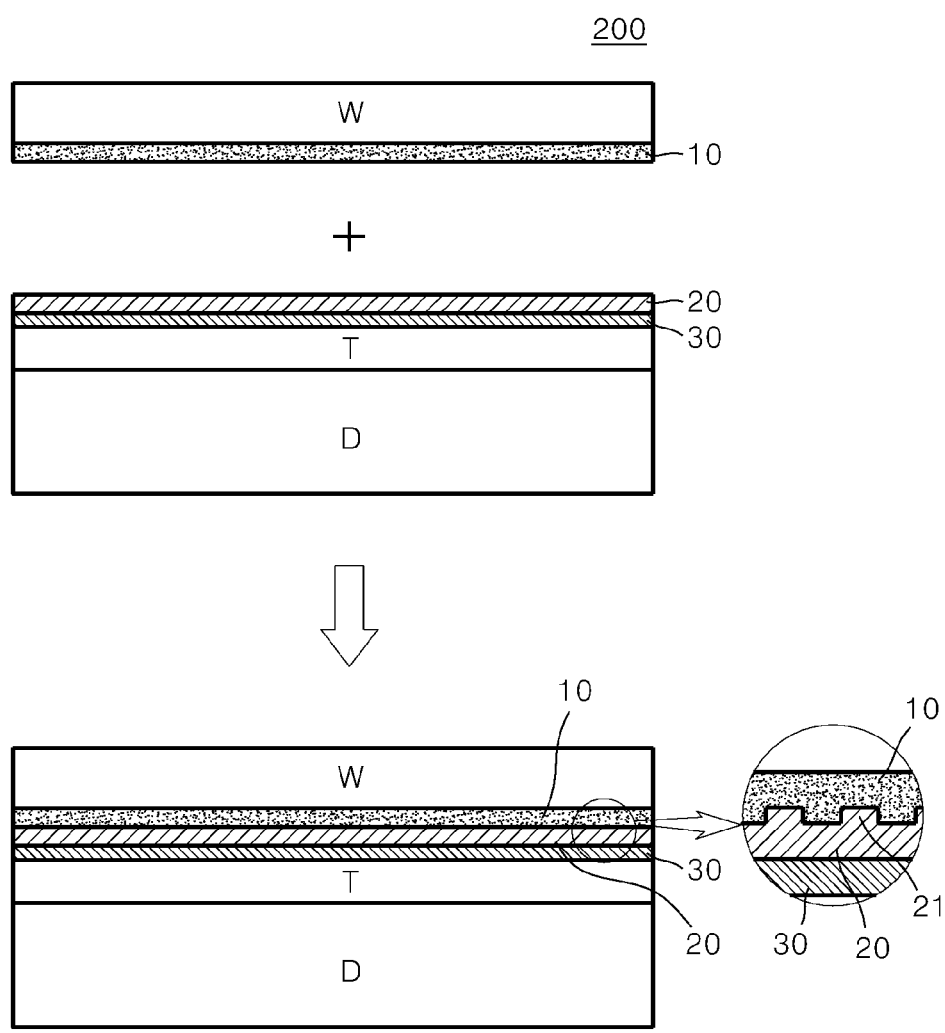
FIG. 5 is an exploded sectional view showing a second display device according to the present invention.

FIG. 5 is an exploded sectional view showing a second display device 200 according to the present invention. In this case, the second display device 200 is the same as the first display device 100 except a touch screen cover layer 30 inserted between the touch screen T and the attachment and detachment control layer 20. Accordingly, a detailed description of the same reference numerals is omitted. In this case, the sectional view has not been represented in a strict sense, and an element not shown in the sectional view for convenience of description may be present.

Referring to FIG. 5, a display D, a touch screen T, a touch screen cover layer 30, an attachment and detachment control layer 20, an attachment and detachment layer 10, and a window W may be sequentially stacked to implement the second display device 200. In this case, the attachment and detachment control layer 20 has the above-described micro protrusions formed therein. A patterned attachment and detachment control pattern 22 may be applied to the attachment and detachment control layer 20, if necessary. In this case, a conductive pattern for forming the touch screen T is positioned on the top or bottom of the cover layer 30. In a strict sense, the cover layer 30 may be said to be part of the touch screen T. The cover layer 30 prevents the touch screen T from being damaged by an impact or contamination. Furthermore, in the second display device 200, the conductive pattern is directly formed on the display D to form the touch screen T. In this case, the touch screen cover layer 30 may be positioned on the top of the display D.

The cover layer 30 may include a print layer or a functional coating layer, and may make beautiful the second display device 200 through various designs or semi-transparence. Furthermore, the cover layer 30 can exclude the influence of a curve and step attributable to a variety of types of patterns or circuits of the touch screen T. When the influence of the curve or step disappears, attachment and detachment for the attachment and detachment control layer 20 of the attachment and detachment layer 10 becomes more facilitated.

A transparent material may be used as the cover layer 30 without any limitation. For example, the cover layer 30 may include a glass substrate or a plastic substrate. Specifically, the glass substrate may be tempered glass or non-tempered glass. Furthermore, the plastic substrate may include one or more of polyethylene terephthalate (PET), polyethylene naphthalate (PEN), polyether sulfone (PES), polyimide (PI), polyarylate (PAR), polycarbonate (PC), polymethyl methacrylate (PMMA) or cycloolefin copolymer (COC). The plastic substrate is more preferred. A thickness of the cover layer 30 is sufficient if it does not damage the touch screen T in a process using the second display device 200.

Like the first display device 100, the second display device 300 may include the attachment and detachment control layer 20 and the pattern 22. The material, characteristics, etc. of the attachment and detachment control layer 20 and the pattern 22 are the same as those described in the first display device 100. Adhesive strength with the attachment and detachment layer 10 according to an embodiment of the present invention may be different depending on the presence of the attachment and detachment control layer 20 and the pattern 22. Adhesive strength when the attachment and detachment control layer 20 and the pattern 22 are present is 0.5 gf/25 mm to 500 gf/25 mm, but adhesive strength when the attachment and detachment control layer 20 and the pattern 22 are not present is 0.1 gf/25 mm to 200 gf/25 mm. If the attachment and detachment layers 10 having the same material and thickness are present, when the attachment and detachment control layer 20 and the pattern 22, the window W can be easily attached without bubbles. Particularly, adhesive strength for the attachment and detachment of the window W can be freely controlled by the attachment and detachment control pattern 22.

If the attachment and detachment layer 10 has adhesive strength of 0.1 gf/25 mm to 500 gf/25 mm, the attachment and detachment layer 10 has a self-adhesive strength. The self-adhesive strength is the property that the attachment and detachment layer 10 autonomously adheres to the attachment and detachment control layer 20 and the pattern 22 without bubbles if the attachment and detachment layer 10 has only to be placed on the attachment and detachment control layer 20 and the pattern 22. Meanwhile, if the attachment and detachment control layer 20 and the pattern 22 are applied to the touch screen cover layer 30, a further improved self-adhesive strength is obtained compared to a case where the attachment and detachment control layer 20 and the pattern 22 are not present.

Figure 6:
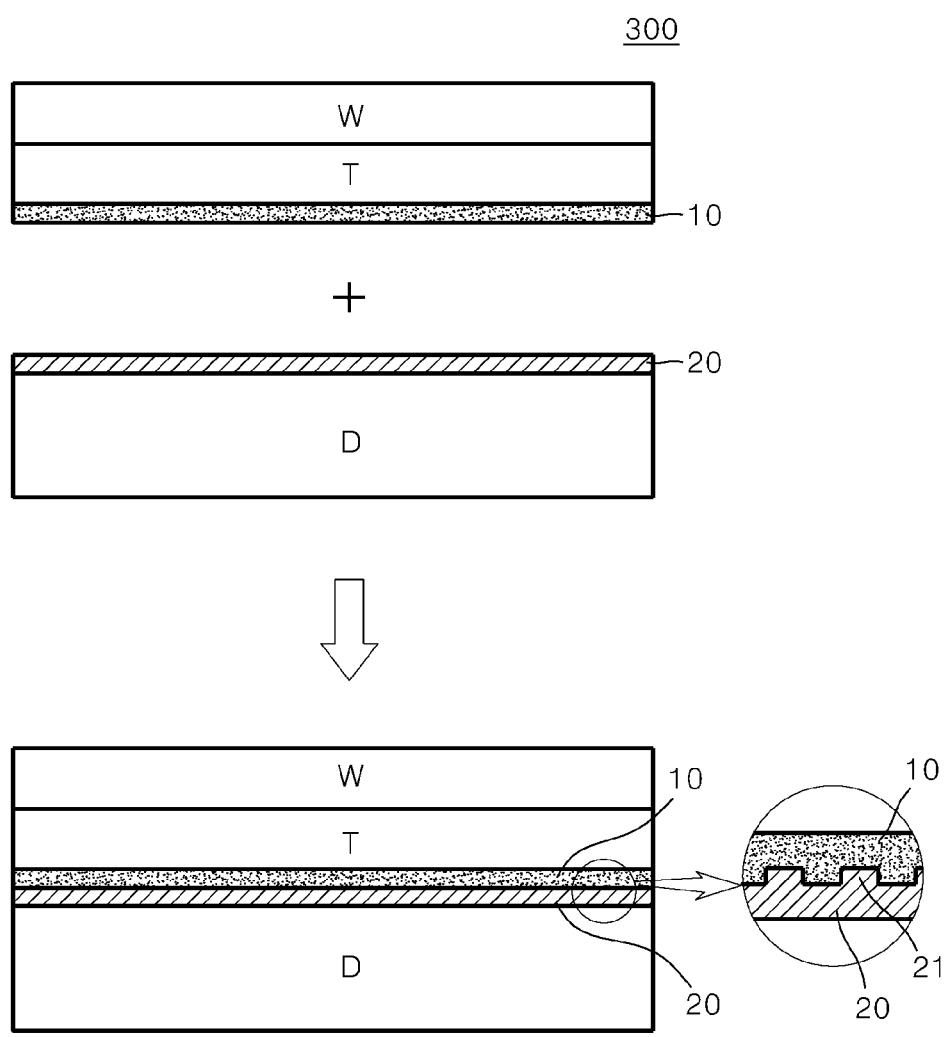
FIG. 6 is an exploded sectional view showing a third display device according to the present invention.

FIG. 6 is an exploded sectional view showing a third display device 300 according to the present invention. In this case, the third display device 300 is the same as the first display device 100 except that the attachment and detachment layer 10 is positioned in the touch screen T and the attachment and detachment control layer 20 is positioned in the display D. Accordingly, a detailed description of the same reference numerals is omitted. In this case, the sectional view has not been represented in a strict sense, and an element not shown in the sectional view for convenience of description may be present.

Referring to FIG. 6, a display D, an attachment and detachment control layer 20, an attachment and detachment layer 10, a touch screen T, and a window W have been sequentially stacked on the third display device 300. In this case, the attachment and detachment control layer 16 has the above-described micro protrusions 21 formed therein. A patterned attachment and detachment control pattern 22 may be applied to the attachment and detachment control layer 16, if necessary. The attachment and detachment layer 10 has a self-adhesive strength. The self-adhesive strength is the property that the attachment and detachment layer 10 autonomously adheres to the touch screen T without bubbles if the attachment and detachment layer 10 has only to be placed on the touch screen T. Meanwhile, if the attachment and detachment control layer 20 is applied to the touch screen T, a further improved self-adhesive strength is obtained compared to a case where the attachment and detachment control layer 20 is not present.

Adhesive strength according to an embodiment of the present invention may be different depending on the presence of the attachment and detachment control layer 20. Adhesive strength when the attachment and detachment control layer 20 is present is 0.5 gf/25 mm to 500 gf/25 mm, but adhesive strength when the attachment and detachment control layer 20 is not present is 0.1 gf/25 mm to 200 gf/25 mm. If the attachment and detachment layers 10 have the same material and thickness, when the attachment and detachment control layer 20 is present, it is easier to attach the window W without bubbles. Furthermore, the separation of the window W occurs relatively easily due to the influence of the attachment and detachment control layer 20. When the attachment and detachment layer 10 is attached to the attachment and detachment control layer 20 and the attachment and detachment control pattern 22 in which the micro protrusions 21 have been formed according to an embodiment of the present invention, a semi-transparent screen is changed transparently because the glue agent of the attachment and detachment layer 10 is burrowed into the space between the micro protrusions 21. Accordingly, although the attachment and detachment control layer 20 and the attachment and detachment control pattern 22 in which the micro protrusions 21 have been formed are used, screen clearness in the transparent state can continue to be maintained.

The attachment and detachment control pattern 22 according to an embodiment of the present invention may be usefully applied to a curved display, that is, a curved surface having an edge. If the area occupied by an uneven part "f" in the edge, that is, a curved surface, is increased, attachment at the edge, that is, a curved surface, becomes stronger because binding power between the attachment and detachment layer 10 and the uneven part "f" is increased. Likewise, if the uneven part "f" is positioned in a bent part of the third display device 300, attachment to the display D of the touch screen T can become stable.

In the first to third display devices according to the embodiments of the present invention, when the window W is damaged, a new window W has only to be selected and attached to replace the damaged window. Specifically, the damaged window W is separated and replaced with the new window W by attachment. A process of replacing the window W may be directly performed by a consumer through a manual work, and the time taken to replace the window is very short. Furthermore, the display device can be easily reused because only the window W has only to be removed. Moreover, the window W can be easily attached without bubbles because it is attached and detached. A manufacturing process is simplified because a manufacturer has only to fabricate only a portion other than the window W and does not need to perform an adhesion process.

Meanwhile, the first to third display device 100, 200, 300 has been illustrated as having the attachment and detachment layer 10 in the window or touch screen and having the attachment and detachment control layer 20 in a corresponding touch screen or display. In some cases, the attachment and detachment control layer 20 may be present in the window or touch screen, and the attachment and detachment layer 10 may be present in a corresponding touch screen or display. In this case, the former case has been taken as an example. Furthermore, the adhesive layer and the attachment and detachment layer may be added to suitable locations in addition to the above-described locations. For example, the adhesive layer or the attachment and detachment layer may be present between the window W and the touch screen T.

As described above, although the preferred embodiments of the present invention have been described in detail, the present invention is not limited to the embodiments and may be modified in various ways by a person having ordinary knowledge in the art without departing from the technical spirit of the present invention. For example, separate means, such as a groove, may be provided in the ejection of a display device in order to facilitate the attachment and detachment of the window structure.

DESCRIPTION OF REFERENCE NUMERALS 100, 200, 300; first to third display devices
10; attachment and detachment layer
20; attachment and detachment control layer
21; micro protrusion
22; attachment and detachment control pattern
30; touch screen cover layer
D; display T; touch screen
W; window

The invention claimed is:

1. A display device comprising:
a display;
a touch screen attached to the display;
an attachment and detachment control layer attached to the touch screen;
an attachment and detachment layer detachably to the attachment and detachment control layer, the attachment and detachment layer having an adhesive strength of 0.1 gf/25 mm to 500 gf/25 mm; and
a window attached to the attachment and detachment layer,
wherein the attachment and detachment control layer includes an attachment and detachment control pattern formed towards the attachment and detachment layer, the attachment and detachment control pattern being divided into an uneven part having micro protrusions formed thereon and a flat part having no micro protrusion, and
wherein the attachment and detachment control pattern has a stripe form, a lattice form, a fence form, or a combination of a stripe form, a lattice form and a fence form.

2. The display device of claim 1, wherein the attachment and detachment layer is formed of any one selected from a thermosetting resin of an acrylic polymer, a silicon-based polymer or an urethane-based polymer, an adhesive in which a cross linker is mixed with an ultraviolet curing resin, a mixture of the thermosetting resin and the adhesive, and a copolymer thereof.

3. The display device of claim 1, wherein the attachment and detachment layer is burrowed into the micro protrusions of the attachment and detachment control layer to make transparent the attachment and detachment control layer.

4. The display device of claim 1, wherein the attachment and detachment control layer comprises a fluoro-based resin or a silicon-based resin.

5. The display device of claim 1, wherein the attachment and detachment control layer comprises:
a deposition layer made of titania ($TiO_2$) or silica ($SiO_2$), and
a layer comprising a fluoro-based resin or a silicon-based resin on the deposition layer.

6. The display device of claim 1, wherein the attachment and detachment layer is configured to have an adhesive strength of 0.5 gf/25 mm to 500 gf/25 mm by the attachment and detachment control pattern of the attachment and detachment control layer.

7. The display device of claim 1, wherein the micro protrusions have a cross section forming an angle, a curvature or a combination thereof.

8. The display device of claim 1, wherein the micro protrusions are arranged in a line form, a lattice form, an island form, or a combination of a line form, a lattice form, an island form.

9. The display device of claim 1, wherein the uneven part corresponds to a curved edge or a bent part.

10. A method of manufacturing a display device, the method comprising:
preparing a display;
attaching a touch screen to the display;

preparing an attachment and detachment control layer having an attachment and detachment control pattern, wherein the attachment and detachment control pattern is divided into an uneven part having micro protrusions formed thereon and a flat part having no micro protrusion, and the attachment and detachment control pattern has a stripe form, a lattice form, a fence form, or a combination of a stripe form, a lattice form and a fence form;

attaching the attachment and detachment control layer to the touch screen;

preparing an attachment and detachment layer having an adhesive strength of 0.1 gf/25 mm to 500 gf/25 mm;

detachably attaching the attachment and detachment layer to the attachment and detachment control layer in such a manner that the attachment and detachment control pattern is in contact with the attachment and detachment layer; and attaching a window to the attachment and detachment layer.

11. The method of claim 10, wherein the attachment and detachment layer is burrowed into the micro protrusions of the attachment and detachment control layer to make transparent the attachment and detachment control layer.

12. The method of claim 10, wherein the micro protrusions have a cross section including an angle, a curvature, or a combination of an angle and a curvature.

13. The method of claim 10, wherein the micro protrusions are arranged in a line form, a lattice form, an island form or a combination of a line form, a lattice form and an island form.

* * * * *